Dec. 19, 1967     K. STEISSLINGER     3,358,572
LOCKING MEANS FOR THE RELEASE MECHANISM IN
PHOTOGRAPHIC OR CINEMATOGRAPHIC CAMERAS
Filed Jan. 22, 1965     2 Sheets-Sheet 1

KURT STEISSLINGER
INVENTOR.

BY R. Frank Smith
Thomas R. Lampe
ATTORNEYS

Dec. 19, 1967  K. STEISSLINGER  3,358,572
LOCKING MEANS FOR THE RELEASE MECHANISM IN
PHOTOGRAPHIC OR CINEMATOGRAPHIC CAMERAS
Filed Jan. 22, 1965  2 Sheets-Sheet 2

KURT STEISSLINGER
INVENTOR.

BY R. Frank Smith
Thomas R. Lampe
ATTORNEYS

United States Patent Office 3,358,572
Patented Dec. 19, 1967

3,358,572
LOCKING MEANS FOR THE RELEASE MECHANISM IN PHOTOGRAPHIC OR CINEMATOGRAPHIC CAMERAS
Kurt Steisslinger, Stuttgart-Hedelfingen, Germany, assignor to Eastman Kodak Company, Rochester, N.Y., a corporation of New Jersey
Filed Jan. 22, 1965, Ser. No. 427,365
Claims priority, application Germany, June 4, 1964, K 53,127
9 Claims. (Cl. 95—11)

ABSTRACT OF THE DISCLOSURE

This application discloses a locking means for a camera shutter actuating mechanism which prevents operation of the mechanism in response to external shock to the camera. The locking means comprises a pivotal lever biased to an inactive position and having a predetermined mass for movement to an active position in response to shock to the camera. In its active position the lever prevents displacement of a shutter operating member. Reference is made to the claims for a legal definition of the invention.

---

The present invention relates to a camera actuating mechanism and a cooperating locking means for securing the actuating mechanism against inadvertent operation caused by a jar, shock or sudden acceleration being imparted to the camera.

In the past, the problem of inadvertent camera actuation has been solved by positioning an intermediate member between the manual release member and the actual shutter tripping member. Such an arrangement normally calls for manual positioning of the intermediate member in and out of locking position either directly through a lever manipulated by the operator or through an often elaborate interconnection with the manual release member of the camera. The direct lever system obviously requires that the operator consciously move the intermediate member in and out of locking position. The drawback to such a system is, of course, that the operator may forget to lock the release, in which case the shutter may be actuated through jarring, dropping or through any other form of external shock. On the other hand, the operator may forget to disengage the locking member when he wishes to take a photograph. Valuable picture-taking seconds may be lost to the photographer after he discovers his mistake or he may attempt to force the camera release, in which case the possibility of damaging the camera is great. The alternate system which requires an interconnection between the locking means and one or more of the actuating levers or slides obviously suffers the weaknesses of all complicated mechanical arrangements, i.e. unreliability and excessive cost.

It is the object of the present invention to provide a simplified locking means for camera actuating mechanisms. It is a further object of this invention to provide a locking means which requires no action on the part of the operator and which is automatically placed in locking position only in the case of a shock to the camera. Upon cessation of the shock the locking member automatically returns to inoperative position, allowing the shutter mechanism to be actuated by the operator free of restraint.

Still another important object of the invention is to provide a reliable locking means, which by virtue of its simplicity of construction, is inexpensive to manufacture and easy to maintain in proper working order.

Other objects will be readily apparent from the following description, reference being made to the accompanying drawings in which.

Figure 1:
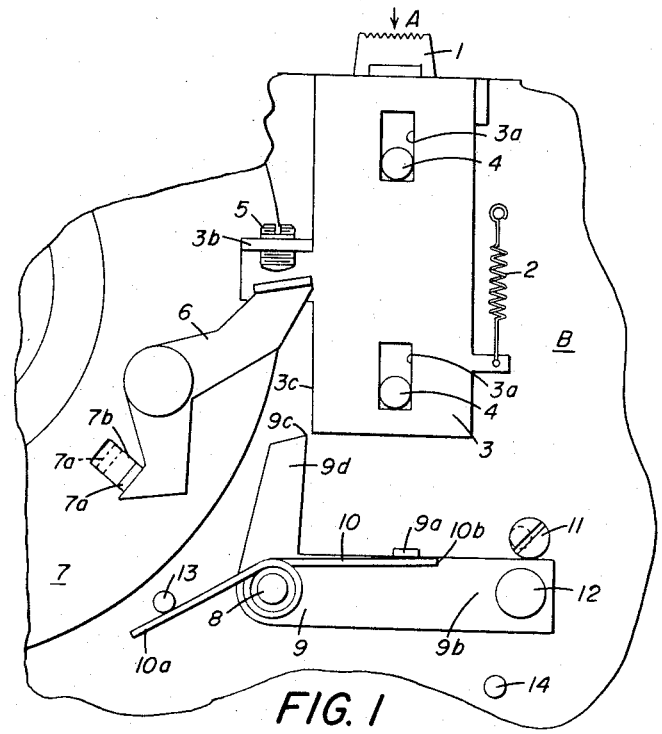
FIG. 1 is a front elevational fragmentary view of a shutter release actuating means and a locking device comprising one embodiment of the present invention shown in normal inactive position.

As is readily apparent from FIG. 1, camera release 1 is displaceably seated in an associated camera housing B. Disposed beneath said camera release and rigidly connected thereto is a release slide member 3 which is biased in an upward direction by return spring 2. Slots 3a in release slide member 3 cooperate with pins 4 which protrude inwardly from a camera housing wall to allow reciprocatable, vertical movement of the release slide member. The release slide member 3 has a horizontal lug 3b extending therefrom having an adjusting screw 5 disposed therein.

Pivoted on the between-the-lens shutter 7 is an intermediate lever 6. Upon the application of force in the direction of arrow A on the camera release 1 the release slide member 3 moves in a downwardly direction. Adjusting screw 5 abuts an end of intermediate lever 6 to pivot same in a clockwise direction. The other end of intermediate lever 6 thereupon contacts a shutter tripping member 7a, which is movable in slot 7b, to move the shutter tripping member to the position indicated by the dotted lines.

Disposed beneath the release slide member 3 and pivotally mounted on bolt 8 extending from the camera housing is a two-armed locking lever 9. A two-legged spring 10 is wrapped around bolt 8. Leg 10a of the two-legged spring rests against pin 13. The other leg 10b is biased against portion 9a of arm 9b to maintain arm 9b in contact with eccentric bolt 11 with a relatively weak force, thus maintaining the top 9c of lever arm 9d at a short distance from surface 3c of release slide member 3. To improve the effectiveness of locking lever 9 the longer arm 9b may be provided with a weight 12 for the purpose more clearly brought out below. Stop 14, which preferably is resiliently mounted or made of an elastic material, limits the pivotal path of lever 9.

Figure 2:
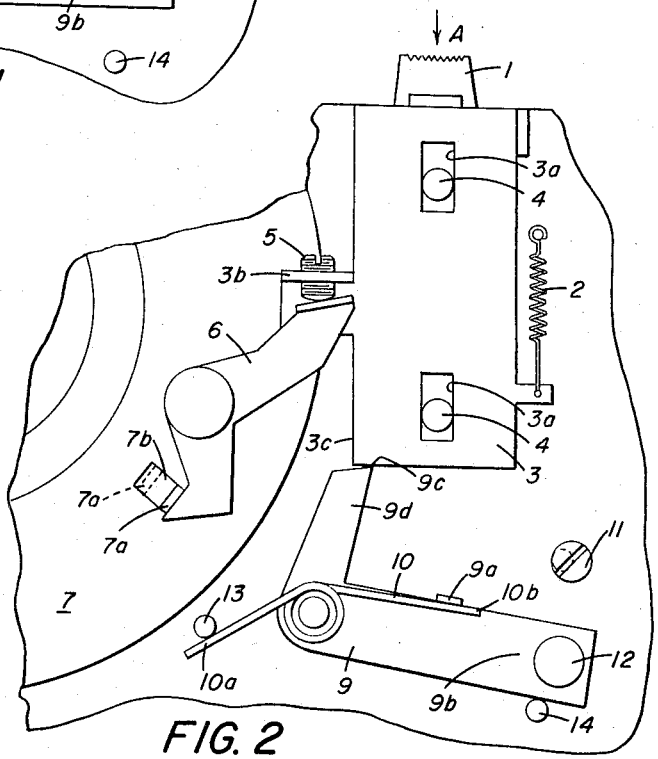
FIG. 2 is a view similar to that shown in FIG. 1 showing the locking device in active position.

The embodiment of the invention as described in FIGS. 1 and 2 operates as follows. In the event of a shock to the camera housing of the nature tending to cause release slide member 3 to move in the direction of the arrow A, such as for example may arise due to dropping the camera or in some other manner imparting a severe blow to same, lever 9 pivots in a clockwise direction against the bias of two-legged spring 10 (FIG. 2). Top 9c of lever arm 9d passes below release slide member 3 and stops its movement after the release slide member has covered a short distance, thereby preventing it from rotating intermediate lever 6. It is necessary that these two parts be properly adjusted with respect to one another so that the top 9c of the lever arm passes below the release slide member before the latter has a chance to move more than a small distance from its rest position. The proper initial positioning of lever arm 9 may be accomplished through eccentric bolt 11. Additional shock sensitivity is imparted to the lever arm through weight 12 on lever arm 9b. Upon cessation of the shock, spring 10 returns lever 9 to its initial rest position as shown in FIG. 1 thus allowing the camera actuating mechanism to operate free of restraint.

Figure 3:
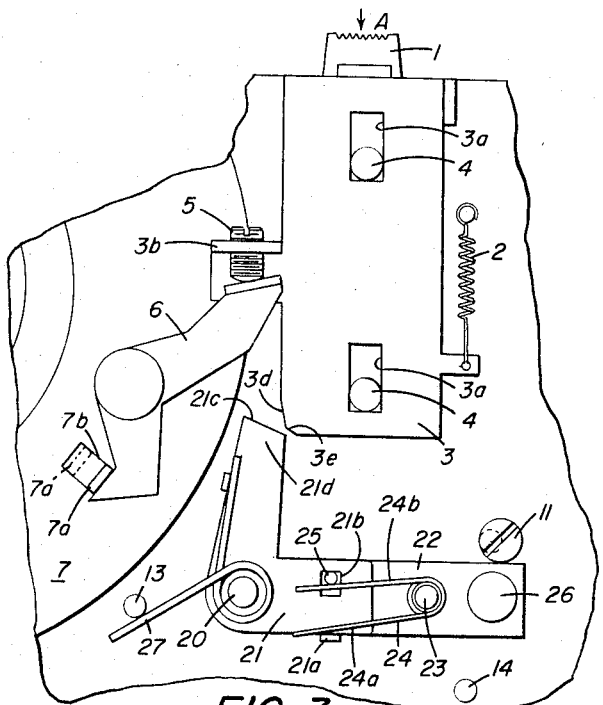
FIG. 3 is a front elevational fragmentary view of an alternative embodiment of the present invention showing the locking means in normal inactive position and the camera release in its initial position.
Figure 4:
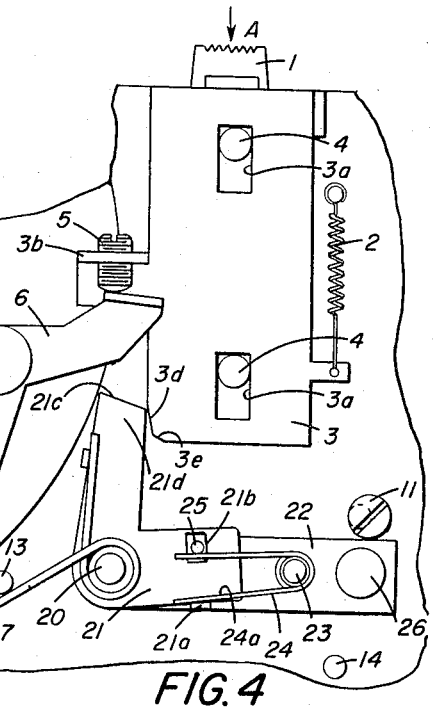
FIG. 4 is a view of the embodiment shown in FIG. 3 showing the camera release in actuated position.

The embodiment of the invention as shown in FIG. 3 is similar to the embodiment described above. In this embodiment release slide member 3 has bevelled portions 3d and 3e. The locking member is comprised of two levers 21 and 22 each of which is pivoted about bolt 20. As may most clearly be seen in FIG. 4, lever 21 is two-armed while lever 22 has one arm only. A stud 23 is carried by lever 22 and serves as a support for spring 24. One leg 24a of spring 24 rests against lug 21a projecting from lever 21. The other leg 24b of spring 24 abuts against pin 25 which is rigidly connected to lever 22 and which protrudes through and is movably mounted with respect to an elongated hole 21b which is formed in lever 21. The spring 24 thus maintains the two levers 21 and 22 in an aligned position when the locking member is in its inactive position (FIG. 3). A two-legged spring 27 is wrapped around bolt 20 and by being tensioned against pin 13 and a lug on lever arm 21d maintains the locking member in contact with eccentric bolt 11. A weight 26 may be affixed to lever 22. The operation of this device is as follows: Adjustment by means of bolt 11 is effected in such a manner that the surface 21c (see FIG. 3) of arm 21d is moved to lie in the area of the bevelled portion 3d of release slide member 3. Under normal conditions camera release 1 and release slide member 3 are pushed down by the operator. Lever 21 is pivoted by the bevelled portion 3d in a counterclockwise direction against the tension of spring 24 so that the shutter tripping member 7a can be operated by intermediate lever 6 (FIG. 4).

Figure 5:
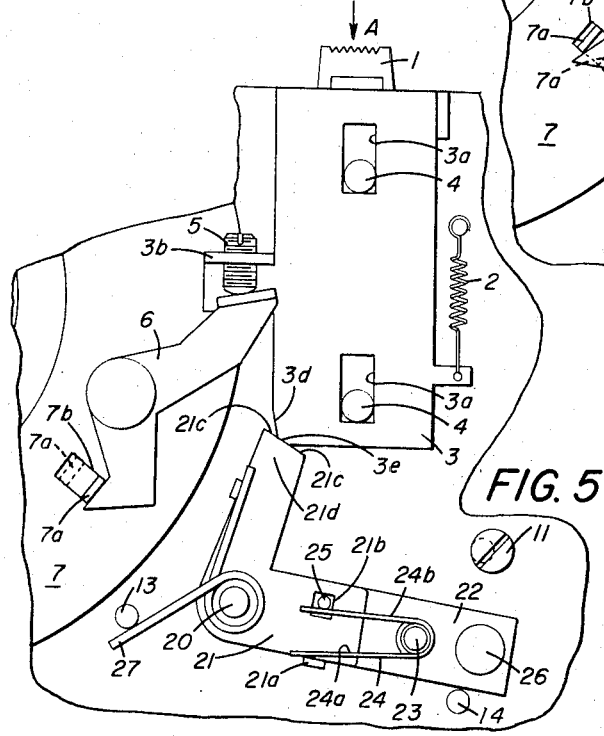
FIG. 5 is a view of the embodiment according to FIGS. 3 and 4 showing the locking means in active position.

In the event of a shock or impact such as to cause the release slide member to move in the direction of arrow A, the levers 21 and 22 are pivoted in a clockwise direction (FIG. 5). Surface 21c shifts in front of surface 3e of the release slide member 3 at the slightest pivotal movement, thus preventing a further downward movement of the release slide member.

Upon cessation of the shock, the elements of the device return to their initial unstressed positions as shown in FIG. 3, due to the action of springs 24 and 27, thus allowing the camera actuating mechanism to be operated in the normal manner by the operator.

While the foregoing description is directed to specific embodiments, it is obvious that modifications are possible without departing from the spirit of the invention. The present disclosure is therefore to be considered as illustrative and not as limiting the scope of the invention which is defined by the following claims.

I claim:
1. In a camera having a housing and a shutter operable to expose film in the camera, the combination comprising:
   a member movable to effect operation of the shutter;
   a lever pivotally mounted on the housing and having inactive and active positions for permitting and preventing movement of said member, respectively; and
   means for biasing said lever to said inactive position thereof;
   said lever having a predetermined mass relative to the biasing force of said biasing means to be displaced from said inactive position to said active position against said biasing force in response to a predetermined shock to the housing to thereby prevent movement of said member.

2. In a camera as claimed in claim 1 wherein said member has a predetermined path of movement and a portion of said lever is positioned in the path of movement of said member in said active position of said lever to thereby block movement of said lever.

3. In a camera having a housing, the combination comprising:
   an actuating mechanism for the camera in said housing having at least one actuatable member movable along a predetermined path;
   locking means including a locking member movable in response to shock to the housing to block said one movable member to prevent movement and inadvertent actuation thereof; and
   means adapted to position said locking member to unblock said one movable member upon cessation of the shock.

4. A camera according to claim 3 wherein said positioning means comprises a spring and wherein said locking member is movable against the bias of said spring in response to shock to the housing to block said one movable member.

5. A camera according to claim 3 wherein said locking member comprises a lever pivoted on said housing and having a portion adapted to be moved into the path of movement of said one movable member to prevent movement of said one movable member.

6. A camera according to claim 5 wherein said lever has two arms, one of said arms being adapted to move into the path of movement of said one movable member upon movement of said lever.

7. A camera according to claim 6 wherein the other of said arms has a relatively large mass with respect to said one arm.

8. In a camera, the combination comprising:
   an actuating mechanism for the camera having at least one movable member;
   a locking member movable from an inactive to an active position in response to a shock to block said movable member and prevent inadvertent actuation thereof, said locking member having at least two intersecting integral arms and pivoted about the point of intersection of said arms, one of said arms being adapted to move into the path of said movable member upon movement of said locking member from said inactive to said active position, the other of said arms having a weight thereon; and
   means for biasing said locking member to said inactive position thereof.

9. In a camera having a housing and a shutter operable to expose film in the camera, the combination comprising:
   a member movable along a predetermined path to effect operation of the shutter;
   locking means having an inactive position for permitting movement and an active position for preventing movement of said one movable member; and
   means for biasing said locking means to said inactive position;
   said locking means having a predetermined mass to be displaced from said inactive position to said active position against the biasing force of said biasing means in response to a shock to the housing to thereby prevent movement of said movable member.

References Cited

UNITED STATES PATENTS

| | | | |
|---|---|---|---|
| 591,200 | 10/1897 | Stevenson | 70—1.5 |
| 2,926,581 | 3/1960 | Gebele | 95—53 |

FOREIGN PATENTS

| | | |
|---|---|---|
| 898,193 | 6/1962 | Great Britain. |

NORTON ANSHER, *Primary Examiner.*

FRED L. BRAUN, *Assistant Examiner.*